(12) United States Patent
Lee et al.

(10) Patent No.: US 8,698,730 B2
(45) Date of Patent: Apr. 15, 2014

(54) INSPECTING METHOD FOR ELECTROPHORETIC DISPLAY DEVICE

(75) Inventors: Sung Hoon Lee, Gyeongsangbuk-do (KR); Hyung-Guk Bae, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 420 days.

(21) Appl. No.: 12/850,200

(22) Filed: Aug. 4, 2010

(65) Prior Publication Data
US 2011/0037858 A1    Feb. 17, 2011

(30) Foreign Application Priority Data

Aug. 11, 2009    (KR) .................. 10-2009-0073849

(51) Int. Cl.
*G09G 3/36*    (2006.01)
(52) U.S. Cl.
USPC ........................................... 345/102
(58) Field of Classification Search
None
See application file for complete search history.

(56) References Cited

U.S. PATENT DOCUMENTS

2005/0024082 A1    2/2005  Kitazoe
2006/0044251 A1*   3/2006  Kato et al. ............... 345/98

FOREIGN PATENT DOCUMENTS

KR    1020040103341 A    12/2004
KR    1020030038042 A     5/2005

OTHER PUBLICATIONS

Office Action dated Jan. 8, 2013 from the Korean Intellectual Property Office in counterpart application No. 1020090073849.

* cited by examiner

*Primary Examiner* — William Boddie
*Assistant Examiner* — Carolyn R Edwards
(74) *Attorney, Agent, or Firm* — Morgan, Lewis & Bockius LLP

(57) ABSTRACT

An inspecting method for an electrophoretic display device includes applying first signals into all pixel regions in a display region of the electrophoretic display device to inspect defects on an image; applying second signals into a first part of the pixel regions and maintaining the first signals at second and third parts of the pixel regions; and applying third signals into the first part of the pixel regions and fourth signals at the second part of the pixel regions and maintaining the first signals at to the third part of the pixel regions.

6 Claims, 4 Drawing Sheets partial brightness defect

INSPECTING METHOD FOR ELECTROPHORETIC DISPLAY DEVICE

The present invention claims the benefit of Korean Patent Application No. 10-2009-0073849, filed in Korea on Aug. 11, 2009, which is hereby incorporated by reference in its entirety.

BACKGROUND OF THE INVENTION

1. Field of the Invention

The present invention relates to an electrophoretic display device, and more particularly, to an inspecting method for electrophoretic display device being capable of inspecting a partial brightness problem.

2. Discussion of the Related Art

In general, liquid crystal display (LCD) devices, plasma display panels (PDPs) and organic electro-luminescence displays (OLEDs) have been widely used for display devices. However, recently, to meet rapidly diversified consumers' requirements, various display devices has been introduced.

Particularly, properties of a light weight, thin profile, high efficiency and function for displaying full color moving images have been required in the display devices. To satisfy the properties, electrophoretic display devices, which have merits of papers and other display devices, have been suggested and researched. The electrophoretic display devices use a phenomenon that charged particles move to an anode or a cathode. The electrophoretic display devices have advantages in a contrast ratio, a response time, a full color display, costs, portability, and so on. Differently from the LCD devices, the electrophoretic display devices do not require a polarizer, a backlight unit, a liquid crystal layer, and so on. Accordingly, the electrophoretic display devices also have an advantage in production costs.

FIG. 1 is a schematic view of a related art electrophoretic display device to explain a driving principle of the same. In FIG. 1, the related art electrophoretic display device 1 includes a first substrate 11, a second substrate 36 and an ink layer 57 interposed therebetween. The ink layer 57 includes capsules 63, and each capsule 63 has a plurality of white-dyed particles 59 and a plurality of black-dyed particles 61 therein. The white-dyed particles 59 and the black-dyed particles 61 are negatively and positively charged by a condensation polymerization reaction, respectively.

A plurality of pixel electrodes 28, which are connected to a plurality of thin film transistors (not shown), are formed on the first substrate 11, and each pixel electrode 28 is disposed in each pixel region (not shown). A positive voltage or a negative voltage is selectively applied to each of the pixel electrodes 28. When the capsules 63 including the white-dyed particles 59 and the black-dyed particles 61 have various sizes, a filtering process is performed to select the capsules 63 having a uniform size.

When a positive or a negative voltage is applied to the ink layer 57, the white-dyed particles 59 and the black-dyed particles 61 in the capsules 63 move towards opposite polarities according to polarities of the applied voltage. Therefore, when the black-dyed particles 61 move upward, a black color is displayed. Alternatively, when the white-dyed particles 59 move upward, a white color is displayed.

An inspecting process for defects of the electrophoretic display device is required before shipping to the market. FIG. 2 is a schematic view for explaining a related art inspecting process for the electrophretic display device.

In a first step "ST1", by displaying a black image at an entire surface of the electrophoretic display device, an inspecting process is performed for a white spot.

In a second step "ST2", by displaying a black image at a center of the electrophoretic display device and a gray image at a periphery of the center of the electrophoretic display device, an inspecting process is performed for a contrast ratio.

In third and fourth steps "ST3" and "ST4", by displaying images, which have gradually changed gray levels, at an entire surface of the electrophoretic display device, an inspecting process is performed for image defects, i.e., a white spot or a line brightness problem. Namely, the image displayed in the third step "ST3" has a gray level greater than the image displayed in the fourth step "ST4".

In a fifth step "ST5", by displaying texts at an entire surface of the electrophoretic display device as brightness of the texts is gradually changing, an inspecting process is performed for visual appearance depending on a change of the gray level. Namely, a gray level of the text at an upper portion of the electrophoretic display device is greater than a gray level of the text at a lower portion of the electrophoretic display device.

In a sixth step "ST6", by displaying a highest gray level at a top portion of the electrophoretic display device and a lowest gray level at a bottom portion of the electrophoretic display device, an inspecting process is performed for displaying all gray levels. FIG. 2 shows eight gray levels. Namely, continuous bar patterns having a difference in a gray level are displayed.

In a seventh step "ST7", by displaying a white image at an entire surface of the electrophoretic display device, an inspecting process is performed for a dark spot.

By an inspecting method through the first to seventh steps "ST1" to "ST7", defects of a thin film transistor (TFT) as a switching element, an ink layer, and so on can be inspected.

The related art inspecting method is performed by a total updating. In other word, by applying signals on an entire surface of the electrophoretic display device, images displayed on a previous frame at the entire surface of the electrophoretic display device is changed into new images.

Unfortunately, there is a partial brightness defect. When displaying texts on the electrophoretic display device used for an e-paper or an e-book, a partial updating is used for reducing power consumption. Namely, after comparing images data on a present frame and images data on the previous frame, which is stored at a memory of a driving circuit part, a part of the image data, which are changed with compared to the previous image data, are updated.

In this case, as shown in FIG. 3, a partial brightness defect is generated. Particularly, the partial brightness defect is generated at a center of the electrophoretic display device. In the electrophoretic display device used for the e-paper or the e-book, some pixels may be maintained with the previous frame data during several frame such that the partial brightness defect is generated by a signal interference. However, since only the total updating is performed for the inspecting process in the related art, the partial brightness defect can not be inspected.

SUMMARY OF THE INVENTION

Accordingly, the present invention is directed to an inspecting method for an electrophoretic display device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an inspecting method for an electrophoretic display device includes applying first signals into all pixel regions in a display region of the electrophoretic display device to inspect defects on an image; applying second signals into a first part of the pixel regions and maintaining the first signals at second and third parts of the pixel regions; and applying third signals into the first part of the pixel regions and fourth signals at the second part of the pixel regions and maintaining the first signals at to the third part of the pixel regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
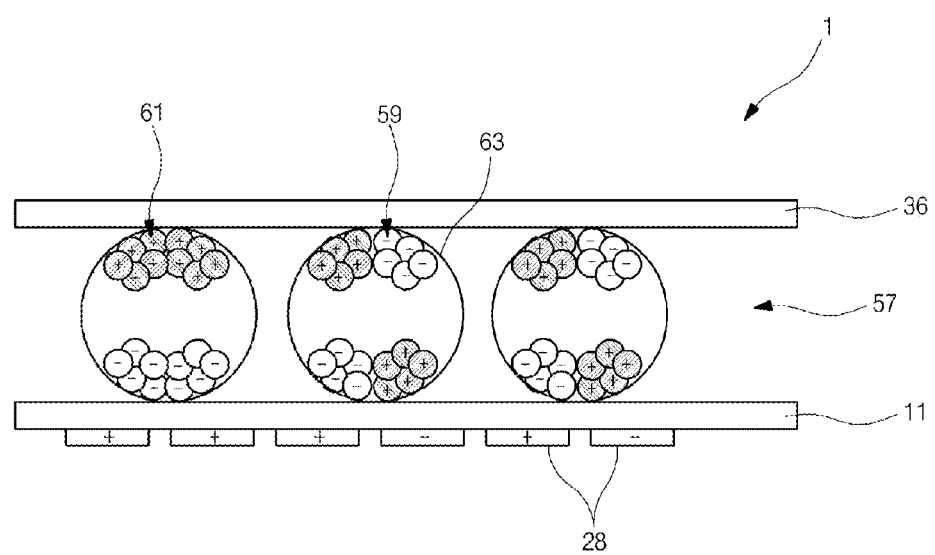
FIG. 1 is a schematic view of a related art electrophoretic display device to explain a driving principle of the same.
Figure 2:
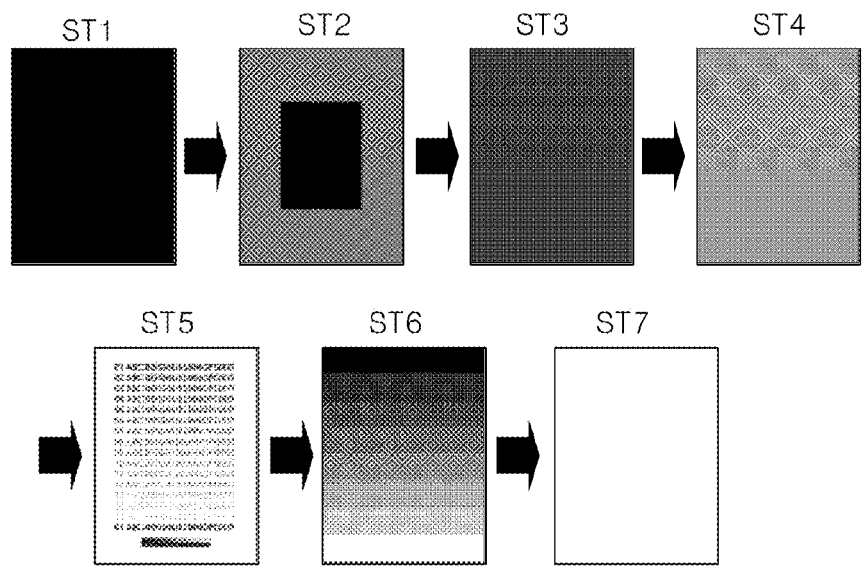
FIG. 2 is a schematic view for explaining a related art inspecting process for the electrophretic display device.
Figure 3:
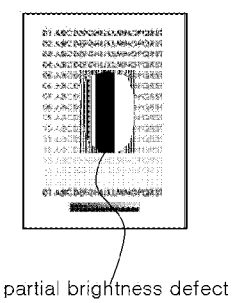
FIG. 3 is a picture for showing a partial brightness defect.
Figure 4:
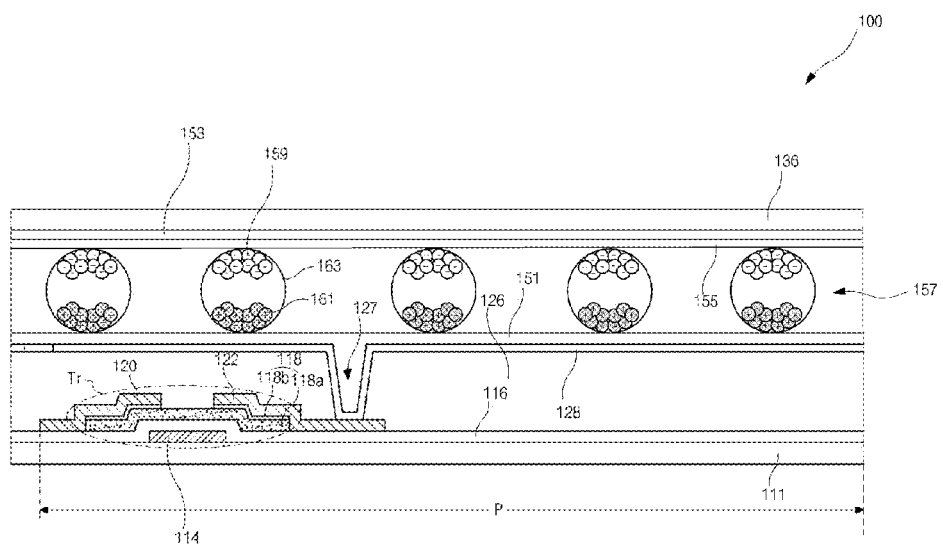
FIG. 4 is a schematic view of an electrophoretic display device to explain a driving principle of the same according to the present invention.

FIG. 4 is a schematic view of an electrophoretic display device to explain a driving principle of the same according to the present invention. In FIG. 4, an electrophoretic display device 100 includes a first substrate 111, a second substrate 136 and an ink layer 157 interposed therebetween. The ink layer 157 includes first and second adhesive layers 151 and 153, a common electrode 155 and capsules 163. The common electrode 155 and the capsules 163 are disposed between the first and second adhesive layers 151 and 153. The first and second adhesive layers 151 and 153 face each other and include a transparent material. The common electrode 155 is formed of a transparent conductive material. Each capsule 163 has a plurality of white-dyed particles 159 and a plurality black-dyed particles 161 therein. The white- and black-dyed particles 159 and 161 are negatively and positively charged by a condensation polymerization reaction, respectively.

The second substrate 136 includes a transparent material such as plastic or glass. The first substrate 111 includes an opaque material such as stainless steel. As occasion demands, the first substrate 111 may be formed of a transparent material such as plastic or glass.

Gate lines (not shown) and data lines (not shown) are formed on the first substrate 111 in a matrix shape. The gate lines and the data lines cross each other to define pixel regions P. A thin film transistor Tr is formed at each crossing portion of the gate lines and the data lines in each pixel region P. The thin film transistor Tr includes a gate electrode 114, a gate insulating layer 116, a semiconductor layer 118, a source electrode 120 and a drain electrode 122. The gate electrode 114 extends from the gate line (not shown). The gate insulating layer 116 covers the gate electrode 114. The semiconductor layer 118 overlaps the gate electrode 114 and includes an active layer 118a and ohmic contact layers 118b. The source electrode 120 contacts the semiconductor layer 118 and extends from the data line (not shown). The drain electrode 122 is spaced apart from the source electrode 120.

A passivation layer 126 is formed on a substantially entire surface of the first substrate 111 including the thin film transistor Tr. The passivation layer 126 includes a drain contact hole 127 exposing the drain electrode 122.

A pixel electrode 128 is formed on the passivation layer 126 in each pixel region P. The pixel electrode 128 is connected to the drain electrode 122 through the drain contact hole 127. The pixel electrode 128 is formed of a transparent conductive material, for example, one of indium-tin-oxide (ITO) and indium-zinc-oxide (IZO).

The electrophoretic display device 100 having the above-mentioned structure uses ambient light, for example, natural light or room electric light, as a light source. The electrophoretic display device 100 displays images by inducing a position change of the white-dyed particles 159 and the black-dyed particles 161 in the capsules 163 depending on a polarity of a voltage selectively applied to the pixel electrode 128.

The above electrophoretic display device mostly displays a black-and-white image. Accordingly, the electrophoretic display device is widely used for an e-paper or an e-book for displaying texts.

An inspecting method for the electrophoretic display device according to the present invention will be explained with reference to FIGS. 5 and 6.

In a first step "ST1", by displaying a black image at an entire surface of the display region of the electrophoretic display device, an inspecting process is performed for a white spot.

In a second step "ST2", by displaying a black image at a center of the display region of the electrophoretic display device and a gray image at a periphery of the center of the electrophoretic display device, an inspecting process is performed for a contrast ratio.

In third and fourth steps "ST3" and "ST4", by displaying images, which have gradually changed gray levels, at an entire surface of the electrophoretic display device, an inspecting process is performed for image defects, i.e., a white spot, a dark spot, or a line brightness problem. Namely, the image displayed in the third step "ST3" has a gray level greater than the image displayed in the fourth step "ST4". The white spot or dark spot problem may be caused by a defect of a thin film transistor or an electrical short in a pixel region. The line brightness may be caused by an electrical short or an electrical broken problem in wires.

In a fifth step "ST5", by displaying texts at an entire surface of the electrophoretic display device as brightness of the texts is gradually changing, an inspecting process is performed for visual appearance depending on a change of the gray level. Namely, a gray level is lowered from an upper portion to a lower portion. In other word, a gray level of the text at an upper portion of the electrophoretic display device is greater than a gray level of the text at a lower portion of the electrophoretic display device.

In a sixth step "ST6", by displaying a highest gray level at a top portion of the electrophoretic display device and a lowest gray level at a bottom portion of the electrophoretic display device, an inspecting process is performed for displaying all gray levels. Namely, continuous bar patterns, where a gray level is lowered from an upper portion to a lower portion, are displayed.

In a seventh step "ST7", by displaying a white image at an entire surface of the electrophoretic display device, an inspecting process is performed for a dark spot.

In the above first to seventh steps "ST1" to "ST7", a total updating is performed such that a partial brightness defect is not inspected. The partial brightness defect is inspected by following eighth to eleventh steps "ST8" to "ST11".

In the eighth and ninth steps "ST8" and "ST9", a partial updating is performed. Namely, a plurality of bar patterns having an island shape are displayed on an upper portion of a screen of the electrophoretic display device and a lower portion of the screen of the electrophoretic display device. The bar patterns are spaced apart from each other along a length direction and a width direction. Namely, the bar patterns are not displayed at a vertical center of each of the upper and lower portions. The bar patterns have a black image.

In the eighth step "ST8", a first image including a black image for the bar patterns and a white image between adjacent bar patterns is displayed at the lower portion with respect to a horizontal center line of the screen. There is a space between horizontally adjacent bar patterns and a space between vertically adjacent bar patterns. Namely, the white images corresponding to the spaces are displayed between adjacent bar patterns. Since the white image is displayed at an entire surface of the screen in the seventh step "ST7", the first image of the eighth step "ST8" is displayed by a partial updating from the image in the seventh step "ST7". In other word, a signal for a white image in the seventh step "ST7" is maintained, and a signal for a black image in the eighth step "ST8" is only newly applied.

In the ninth step "ST9", by a partial updating from the image in the eighth step "ST8", a second image including a black image for the bar patterns and a white image between adjacent bar patterns is displayed at the upper portion with respect to a horizontal center line of the screen. There is a space between horizontally adjacent bar patterns and a space between vertically adjacent bar patterns. Namely, the white images corresponding to the spaces are displayed between adjacent bar patterns. Since the white image is displayed at the upper portion and a space between adjacent bar patterns in the image of the eighth step "ST8", the second image of the ninth step "ST9" is displayed by a partial updating from the image in the seventh step "ST8". In other word, a signal for a white image in the eighth step "ST8" is maintained, and a signal for a black image in the ninth step "ST8" a signal for changing the bar patterns in the eighth step "ST8" into a white image in the ninth step "ST9" are only newly applied.

In the tenth step "ST10", the eighth and ninth steps "ST8" and "ST9" are repeated about four times such that a partial brightness defect can be inspected. Namely, partial updating processes in the eighth and ninth steps "ST8" and "ST9" are repeated to inspect whether the partial brightness defect is generated or not.

In the eleventh step "ST11", by a partial updating from the image of ninth step "ST9" in the tenth step "ST10", a third image for a white image is displayed at an entire surface of the screen. Namely, a signal for changing the bar patterns into the white image is newly applied. Since the partial brightness defect is observed by a gray color image. Accordingly, by displaying the white image at the entire surface of the screen in the eleventh step "ST11", the partial brightness defect is easily inspected.

In other words, in the first to seventh steps "ST1" to "ST7", new signals are applied into all pixel regions in a display region. However, in the eighth to eleventh steps "ST8" to "ST11", new signals are applied into a part of the pixel regions, and previous signals of the rest pixel regions are maintained. In the eighth step "ST8", a second signals into a first part of the pixel regions to form the bar patterns, and previous signals as a first signals at second and third parts of the pixel regions are maintained. In the ninth step "ST9", a third signals are applied to the first part of the pixel regions to change the bar patterns into a white image, and a fourth signals are applied to the second part of the pixel regions to form the bar patterns. In addition, the first signals at the third part of the pixel regions are maintained. In the eleventh step "ST11", a fifth signals are applied to the second part of the pixel region to change the bar patterns of the ninth step "ST9" into a white image. The signals at the first and third parts of the pixel regions are maintained. As a result, a white image is displayed at an entire surface of the display region. A signal for the third part of the pixel regions is maintained through the eighth to eleventh steps "ST8" to "ST11".

Generally, the partial brightness defect is generated at a center of the screen by continuously applying new data. Since no updating is performed at a center of the screen in the eighth and ninth steps "ST8" and "ST9", there is a gray spot at the center of the screen if a partial brightness defect is generated. Since there are the bar patterns, which are spaced apart from each other along the length direction and the width direction, a periphery of the center is continuously updated and the center is never updated. Accordingly, by repeating the partial updating about four times, a partial brightness defect is completely inspected.

The partial brightness defect may be caused by degradation of the TFT's properties. When a glass substrate is used, the TFT is fabricated under a process temperature of about 500 to 600° C. When a plastic substrate is used to obtain a flexible property, the TFT is fabricated under a relatively low process temperature, i.e., lower than 200° C. Since a molecular density of a semiconductor layer is lowered with the low process temperature, a current leakage is generated such that the partial brightness defect may be caused.

When the TFT is driven by a total updating method, there is no leakage current problem because a voltage greater than a threshold voltage of the TFT is applied to the TFT in each frame. Namely, there is no partial brightness defect in the total updating method.

However, as mentioned above, the electrophoretic display device for the e-paper or the e-book is driven by a partial updating method to reduce power consumption. Namely, a signal is applied to pixel regions, where an image is changed, while no signal is applied to pixel regions where an image is not changed. When these updating are repeated, a signal is applied to undesired pixel regions or a gray level of the pixel region is changed because of the leakage current such that the partial brightness defect is caused.

Since a total updating is only performed in the related art inspecting method, the partial brightness defect can not be inspected. However, since not only the total updating but also a partial updating is performed in the inspecting method according to the present invention, the partial brightness defect can be inspected. In addition, since the eighth step and the ninth step for the partial updating are repeated about four times, the inspection is more reliable.

Figure 5:
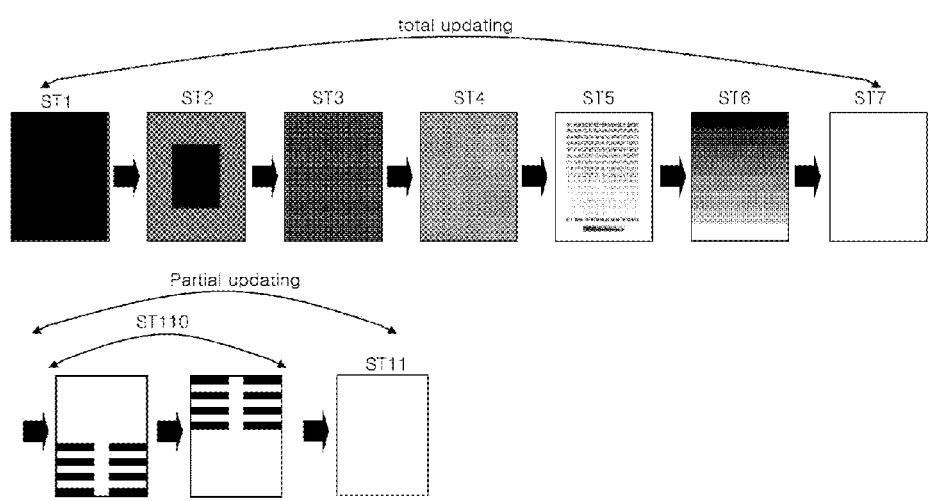
FIG. 5 is a schematic view for explaining an inspecting process for an electrophretic display device according to the present invention.
Figure 6:
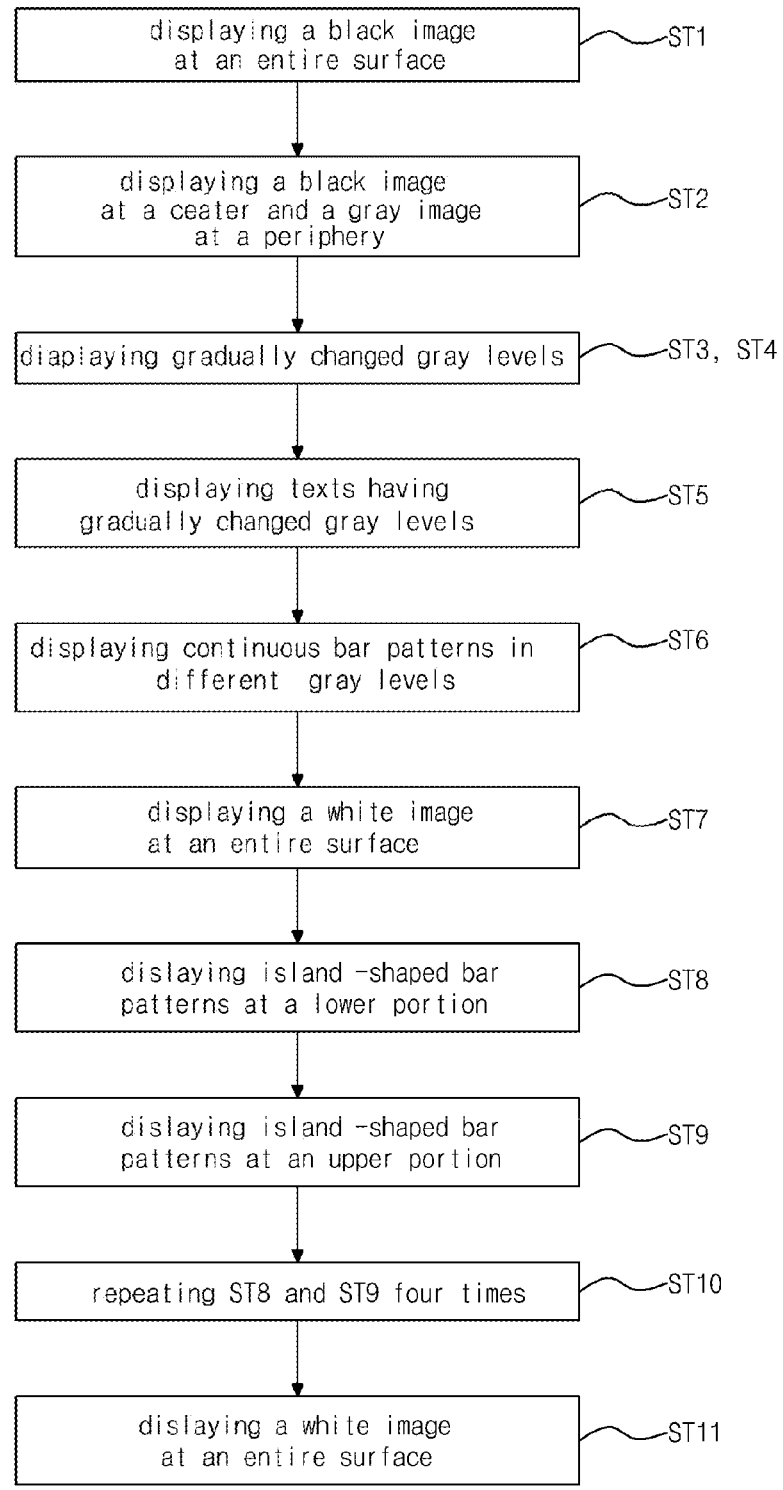
FIG. 6 is a flow chart for explaining an inspecting process for an electrophretic display device according to the present invention.

FIGS. 5 and 6 show the eighth to eleventh steps "ST8" to "ST11" are performed after the first to seventh steps "ST1" and "ST7". Alternatively, the eighth to eleventh steps "ST8" to "ST11" may be performed before the first to seventh steps "ST1" and "ST7". In addition, the ninth step "ST9" may be performed prior to the eighth step "ST8".

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An inspecting method for an electrophoretic display device, comprising:
    applying first signals into all pixel regions in a display region of the electrophoretic display device to inspect defects on an image;
    applying second signals into a first part of the pixel regions and maintaining the first signals at second and third parts of the pixel regions, the third part being a vertical center of the entire display region, whereby the device displays, at a lower portion of the entire display region, a first image including a first black image of a plurality of first bar patterns and a first white image between adjacent first bar patterns; and
    applying third signals into the first part of the pixel regions and fourth signals at the second part of the pixel regions and maintaining the first signals at the third part of the pixel regions, whereby the device displays, at an upper portion of the entire display region, a second image including a second black image of a plurality of second bar patterns and a second white image between adjacent second bar patterns,
    whereby a periphery of the vertical center is updated and the vertical center is not updated.

2. The inspecting method according to claim 1, further comprising a step of total updating including:
    a step of displaying a black image at an entire surface of the display region;
    a step of displaying a black image at a center of the display region and a gray image at a periphery of the center;
    a step of displaying an image having gradually changed gray levels;
    a step of displaying a text at the entire surface of the display region, a gray level of the text lowered from an upper portion to a lower portion of the display region;
    a step of displaying continuous bar patterns, a gray level of the continuous bar patterns lowered from the upper portion to the lower portion of the display region; and
    a step of displaying a white image at the entire surface of the display region.

3. The inspecting method according to claim 1, further comprising applying a fifth signals into the second part of the pixel regions and maintaining the first signal at the third part of the pixel regions and the third signals at the first part of the pixel regions such that a white image is displayed at an entire surface of the display region.

4. The inspecting method according to claim 3, further comprising repeating the step of applying the second signals and maintaining the first signals and the step of applying the third signals and the fourth signals and maintaining the first signals after the step of applying the third signals and the fourth signals and maintaining the first signals and before the step of applying the fifth signals into the second part of the pixel regions and maintaining the first signal at the third part of the pixel regions and the third signals at the first part of the pixel regions.

5. The inspecting method according to claim 4, wherein the step of repeating the step of applying the second signals and maintaining the first signals and the step of applying the third signals and the fourth signals and maintaining the first signals is performed four times.

6. The inspecting method according to claim 1, wherein a first image including a first black image for a plurality of first bar patterns and a first white image between adjacent first bar patterns at a lower portion with respect to a horizontal center line of the display region is displayed by the step of applying the second signals and maintaining the first signals, and a second image including a second black image for a plurality of second bar patterns and a second white image between adjacent second bar patterns at an upper portion with respect to the horizontal center line of the display region is displayed by the step of applying the third signals and the fourth signals and maintaining the first signals, and wherein the first bar patterns are spaced apart from each other along a length direction and a width direction of the display region, and the second bar patterns are spaced apart from each other along the length direction and the width direction of the display region.

* * * * *